(12) United States Patent
Kruckenberg

(10) Patent No.: US 11,359,577 B2
(45) Date of Patent: Jun. 14, 2022

(54) MULTI-DEGREE OF FREEDOM ACOUSTIC PANEL

(71) Applicant: Rohr, Inc., Chula Vista, CA (US)

(72) Inventor: Teresa Kruckenberg, La Mesa, CA (US)

(73) Assignee: Rohr, Inc., Chula Vista, CA (US)

( * ) Notice: Subject to any disclaimer, the term of this patent is extended or adjusted under 35 U.S.C. 154(b) by 807 days.

(21) Appl. No.: 16/108,710

(22) Filed: Aug. 22, 2018

(65) Prior Publication Data

US 2020/0063691 A1  Feb. 27, 2020

(51) Int. Cl.
| | |
|---|---|
| *F02K 1/82* | (2006.01) |
| *B32B 3/12* | (2006.01) |
| *B32B 3/26* | (2006.01) |
| *F02C 7/24* | (2006.01) |
| *B64D 29/00* | (2006.01) |
| *B64D 33/02* | (2006.01) |
| *F02C 7/045* | (2006.01) |

(52) U.S. Cl.
CPC ............... *F02K 1/827* (2013.01); *B32B 3/12* (2013.01); *B32B 3/266* (2013.01); *F02C 7/24* (2013.01); *B32B 2307/10* (2013.01); *B32B 2605/18* (2013.01); *B64D 29/00* (2013.01); *B64D 2033/0206* (2013.01); *F02C 7/045* (2013.01); *F05B 2250/283* (2013.01); *F05D 2260/96* (2013.01)

(58) Field of Classification Search
CPC . F02K 1/827; B32B 3/12; B32B 3/266; F02C 7/24
See application file for complete search history.

(56) References Cited

U.S. PATENT DOCUMENTS

| | | |
|---|---|---|
| 6,274,216 B1 | 8/2001 | Gonidec et al. |
| 6,536,556 B2 | 3/2003 | Porte et al. |
| 8,302,733 B2 | 11/2012 | Peiffer et al. |
| 8,727,072 B2 | 5/2014 | Ayle |
| 9,403,338 B2 | 8/2016 | Tuczek |
| 9,469,985 B1 | 10/2016 | Ichihashi |
| 9,592,918 B2 | 3/2017 | Yu et al. |
| 9,732,677 B1 | 8/2017 | Chien et al. |
| 9,764,818 B2 | 9/2017 | Nampy |
| (Continued) | | |

OTHER PUBLICATIONS

EP search report for EP19192920.7 dated Jan. 17, 2020.

*Primary Examiner* — Joseph S Del Sole
*Assistant Examiner* — John Robitaille
(74) *Attorney, Agent, or Firm* — Getz Balich LLC

(57) ABSTRACT

An acoustic panel includes a first skin, a second skin and a cellular core vertically between and connected to the first skin and the second skin. The cellular core includes a plurality of cavities, a plurality of sidewalls and a plurality of septums. Each of the plurality of cavities extends vertically through the cellular core between the first skin and the second skin. Each of the plurality of cavities extends laterally within the cellular core between a respective laterally adjacent pair of the plurality of sidewalls. Each of the plurality of septums vertically divides a respective one of the plurality of cavities into a set of fluidly coupled sub-cavities. A set of the plurality of septums is formed by a ply of folded material. Each of the set of the plurality of septums have a four-sided polygonal shape when viewed in a plane that is parallel to the first skin.

20 Claims, 14 Drawing Sheets

(56) References Cited

U.S. PATENT DOCUMENTS

| | | |
|---|---|---|
| 2008/0020176 A1 | 1/2008 | Ayle |
| 2017/0182723 A1 | 6/2017 | Calisch et al. |
| 2017/0225764 A1* | 8/2017 | Nampy .................... B64C 1/40 |
| 2020/0003230 A1 | 1/2020 | Alonso-Miralles |

* cited by examiner

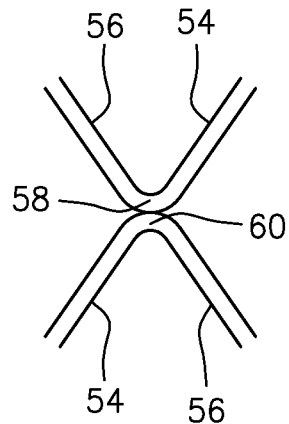
FIG. 23
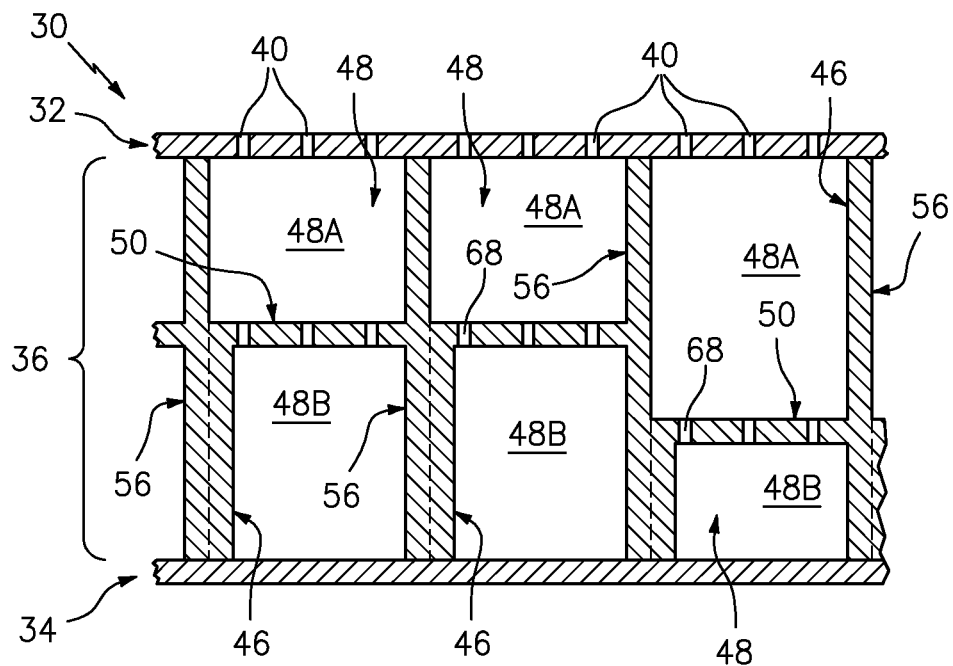
FIG. 24
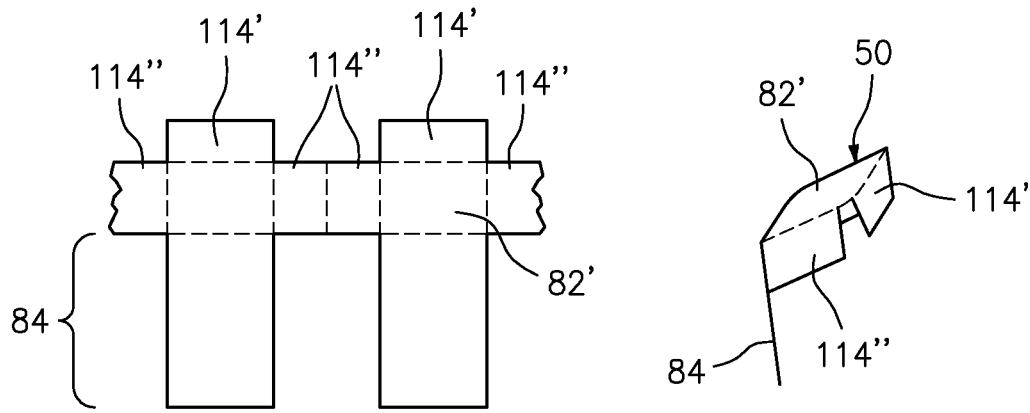
FIG. 25
FIG. 26

MULTI-DEGREE OF FREEDOM ACOUSTIC PANEL

BACKGROUND

1. Technical Field

This disclosure relates generally to acoustic panels and, more particularly, to multi-degree of freedom acoustic panels and methods for forming such panels.

2. Background Information

A nacelle of a typical aircraft propulsion system includes one or more acoustic panels to attenuate propulsion system related noise. One type of such acoustic panels is a double degree of freedom (DDoF) acoustic panel. A typical DDoF acoustic panel includes a honeycomb core disposed between and bonded to a perforated outer skin and a non-perforated inner skin. A septum is disposed within each hexagonal cavity of the honeycomb core to divide that cavity into a pair of fluidly coupled sub-cavities, thereby forming a double-degree of freedom acoustic resonance chamber. Typically, each septum is formed from a discrete piece of material (e.g., a plug) which is individually placed into a respective cavity and then attached to cavity sidewalls. Such an individual septum arrangement process can be time consuming and expensive. There is a need in the art therefore for more efficient septum formation processes and associated acoustic panels.

SUMMARY OF THE DISCLOSURE

According to an aspect of the present disclosure, an acoustic panel is provided that includes a first skin, a second skin and a cellular core vertically between and connected to the first skin and the second skin. The cellular core includes a plurality of cavities, a plurality of sidewalls and a plurality of septums. Each of the plurality of cavities extends vertically through the cellular core between the first skin and the second skin. Each of the plurality of cavities extends laterally within the cellular core between a respective laterally adjacent pair of the plurality of sidewalls. Each of the plurality of septums vertically divides a respective one of the plurality of cavities into a set of fluidly coupled sub-cavities. A set of the plurality of septums is formed by a ply of folded material. Each of the set of the plurality of septums have a four-sided polygonal shape when viewed in a plane that is parallel to the first skin.

According to another aspect of the present disclosure, another acoustic panel is provided that includes a first skin, a second skin and a cellular core vertically between and connected to the first skin and the second skin. The cellular core includes a plurality of cavities, a plurality of sidewalls and a plurality of septums. Each of the plurality of cavities extends vertically through the cellular core between the first skin and the second skin. Each of the plurality of cavities extends laterally within the cellular core between a respective laterally adjacent pair of the plurality of sidewalls. Each of the plurality of septums vertically divides a respective one of the plurality of cavities into a set of fluidly coupled sub-cavities. The plurality of sidewalls include a first sidewall and a second sidewall. The plurality of cavities include a first cavity that extends laterally between the first sidewall and the second sidewall. The plurality of septums include a first septum within the first cavity. A ply of folded material forms at least the first septum and a portion of the first sidewall. The ply of folded material contacts the second skin at an interface between the first sidewall and the second skin, and is separated from the second skin at an interface between the second sidewall and the second skin.

According to still another aspect of the present disclosure, another acoustic panel is provided that includes a first skin, a second skin and a cellular core vertically between and connected to the first skin and the second skin. The cellular core includes a plurality of cavities, a plurality of sidewalls and a plurality of septums. Each of the plurality of cavities extends vertically through the cellular core between the first skin and the second skin. Each of the plurality of cavities extends laterally within the cellular core between a respective laterally adjacent pair of the plurality of sidewalls. Each of the plurality of septums vertically divides a respective one of the plurality of cavities into a set of fluidly coupled sub-cavities. A set of the plurality of septums is formed by a ply of folded material. The plurality of septums includes a first septum. The first septum includes a first portion of the ply of folded material and a second portion of the ply of folded material that lays against the first portion of the ply of folded material.

The four-sided polygonal shape may be a square.

The set of the plurality of septums may be arranged in a longitudinal extending array.

The plurality of sidewalls may include a first sidewall and a second sidewall. The plurality of cavities may include a first cavity that extends laterally between the first sidewall and the second sidewall. The plurality of septums may include a first septum within the first cavity. The ply of folded material may form the first septum. The first sidewall may include a second ply of material. The second sidewall may include a third ply of material.

The first sidewall may further include a first portion of the ply of folded material.

The second sidewall may further include a second portion of the ply of folded material.

The first portion may have a first vertical height. The second portion may have a second vertical height that is different from the first vertical height The first portion may vertically contact the second skin. The second portion may not contact the second skin.

The first portion may vertically contact the second skin.

The ply of folded material may be configured from or otherwise include metal.

The ply of folded material may be configured from or otherwise include polymer.

The ply of folded material may be configured from or otherwise include fiber-reinforced composite.

The ply of folded material may be configured from or otherwise include woven fiber mesh.

The first skin may be a perforated first skin.

A second set of the plurality of septums may be formed by a second ply of folded material. The second set of the plurality of septums may be laterally adjacent the set of the plurality of septums.

The plurality of septums may include a first septum. The first septum may include a first portion of the ply of folded material and a second portion of the ply of folded material that overlaps and lays against the first portion of the ply of folded material.

The ply of folded material may further form a portion of the second sidewall.

The ply of folded material may further form a second of the plurality of septums that is longitudinally adjacent the first septum.

The first septum may include a four-sided polygonal shape when viewed in a plane that is parallel to the first skin.

The foregoing features and the operation of the invention will become more apparent in light of the following description and the accompanying drawings.

BRIEF DESCRIPTION OF THE DRAWINGS

FIG. 23 is a cross-sectional illustration of another multi-degree of freedom acoustic panel, in accordance with various embodiments;

FIG. 24 is a side-sectional illustration of another multi-degree of freedom acoustic panel, in accordance with various embodiments; and FIGS. 25 and 26 illustrate another sequence of steps for forming another septum array member, in accordance with various embodiments.

DETAILED DESCRIPTION

Figure 1:
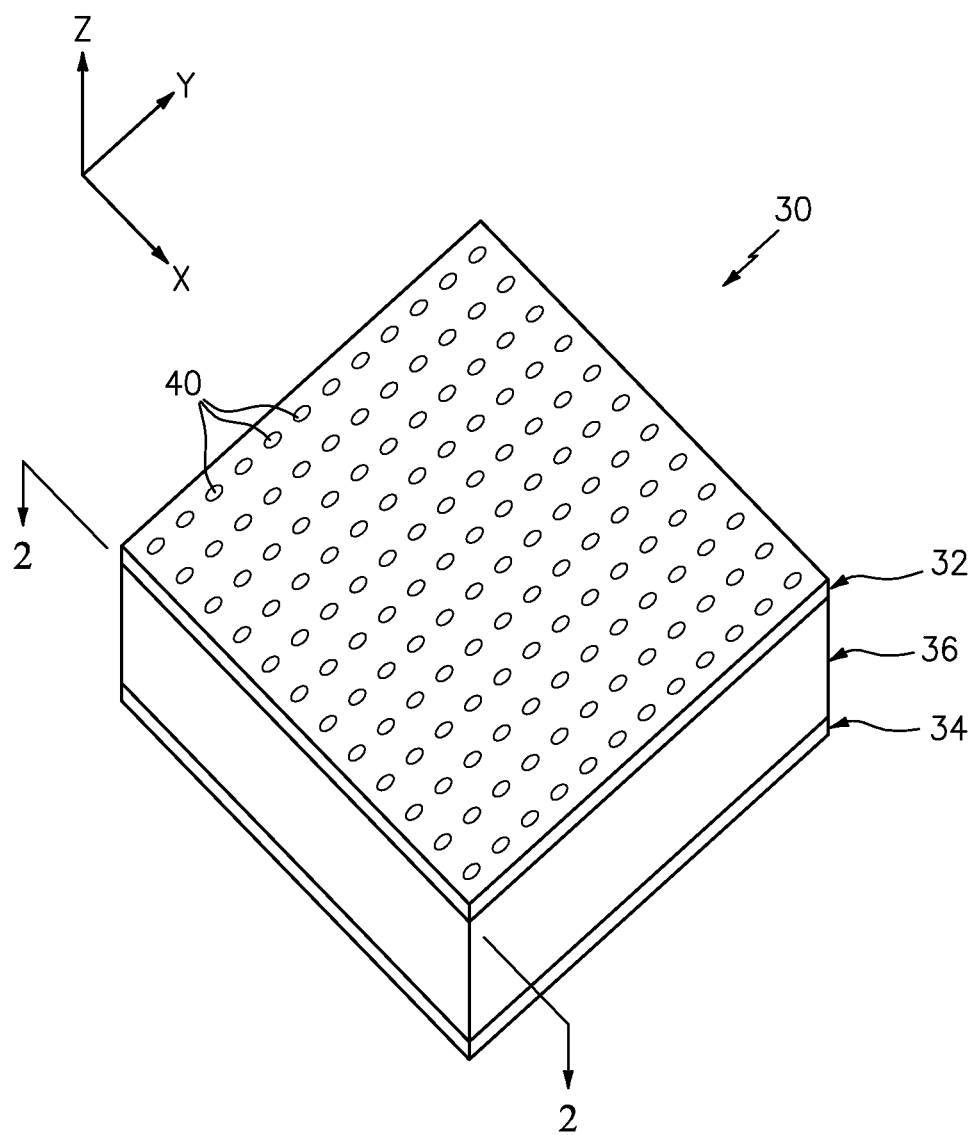
FIG. 1 is a perspective schematic illustration of a multi-degree of freedom acoustic panel, in accordance with various embodiments.

FIG. 1 is a perspective illustration of a portion of a multi-degree of freedom acoustic panel 30; e.g., a double degree of freedom (DDoF) acoustic panel. This acoustic panel 30 is configured to attenuate sound (e.g., noise) generated, for example, by an aircraft propulsion system such as a turbofan propulsion system or a turbojet propulsion system. With such a configuration, the acoustic panel 30 may be configured with a nacelle of the propulsion system. The acoustic panel 30, for example, may be configured as or with an inner or outer barrel, a translating sleeve of a thrust reverser, a blocker door, etc. Alternatively, the acoustic panel 30 may be configured with another component/structure of the aircraft such as its fuselage, a wing or a pylon for the propulsion system. Furthermore, the acoustic panel 30 may be configured to also or alternatively attenuate aircraft related sound other than that generated by the propulsion system. The acoustic panel 30 of the present disclosure, of course, may alternatively be configured for non-aircraft sound attenuation applications.

The acoustic panel 30 of FIG. 1 extends longitudinally along a y-axis. The acoustic panel 30 extends laterally along an x-axis. The acoustic panel 30 extends vertically along a z-axis. The term "vertical" is used herein to describe a depthwise panel direction and is not limited to a gravitational up/down direction. Furthermore, for ease of illustration, the x-y plane is shown as a generally flat plane. However, in other embodiments, the x-y plane and, thus, the acoustic panel 30 may be curved and/or follow an undulating geometry. For example, the x-y plane and, thus, the acoustic panel 30 may be arcuate, cylindrical or conical with or without radial undulations. Thus, the vertical direction may change at different locations along the x-y plane. For example, for a cylindrical, conical or spherical acoustic panel, the vertical direction may be a radial direction, the longitudinal direction may be an axial (or circumferential) direction, and the lateral direction may be a circumferential (or axial) direction.

The acoustic panel 30 includes a (e.g., acoustic) porous top skin 32 (e.g., a perforated face skin), a solid, non-perforated bottom skin 34 (e.g., a back skin) and a cellular core 36. Note, the terms "top" and "bottom" are used in this disclosure to describe the relative position of an element as viewed in the figures. The present disclosure, however, is not limited to such an orientation.

Briefly, the cellular core 36 is arranged and extends vertically between the top skin 32 and the bottom skin 34. The cellular core 36 is also connected to the top skin 32 and the bottom skin 34. The cellular core 36, for example, may be welded, brazed, fused, adhered and/or otherwise bonded to or integral with the top skin 32 and/or the bottom skin 34 as discussed below in further detail.

Figure 3:
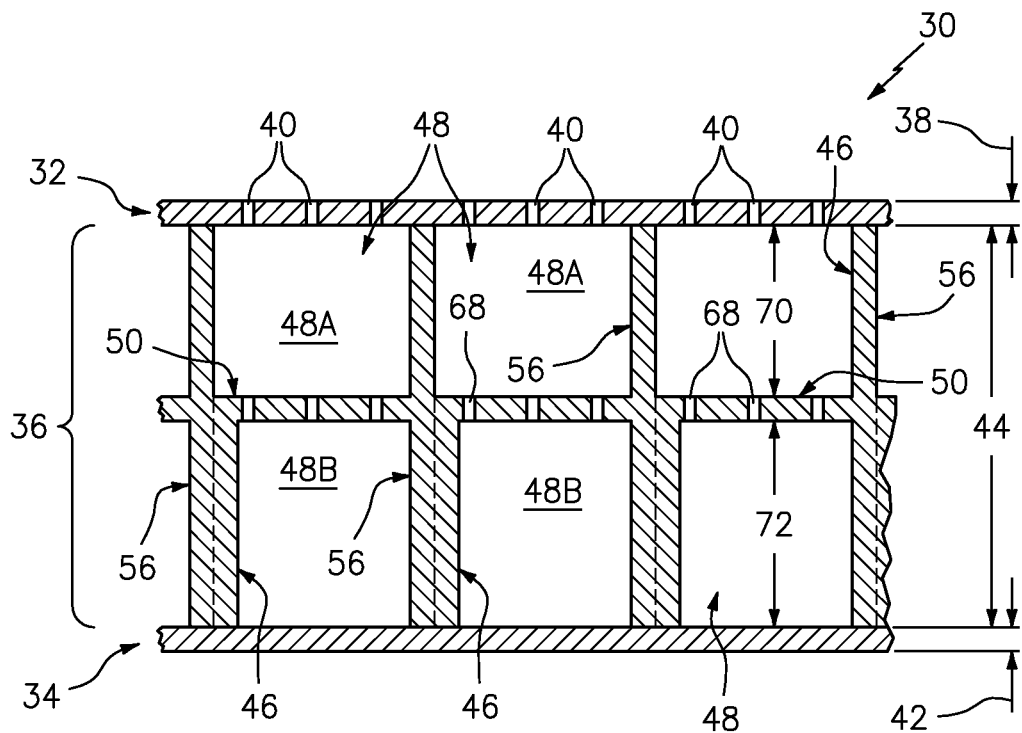
FIG. 3 is a side-sectional illustration of the panel of FIG. 1 taken along line 3-3 in FIG. 2, in accordance with various embodiments.

The top skin 32 of FIG. 1 is configured as a relatively thin sheet or layer of material that extends longitudinally and laterally along the x-y plane. This top skin material may include, but is not limited to, a metal (e.g., sheet metal or metal foil), a polymer (e.g., thermoplastic or thermoset material), a fiber reinforced composite (e.g., fiberglass composite, carbon fiber composite, aramid fiber composite, etc.), or a combination thereof. In some embodiments, the top skin 32 may be formed from woven fiber mesh (e.g., polymer or fiber mesh). Referring now to FIG. 3, the top skin 32 has a vertical thickness 38, which extends vertically between opposing first skin top and bottom side surfaces. The top skin 32 includes a plurality of passages 40; e.g., perforations such as through-holes. Each of these passages 40 extends generally vertically through the top skin 32 between its side surfaces. While the passages 40 are described above and illustrated in FIG. 3 as through-holes for ease of description, one or more of the passages 40 may also or alternatively be formed by one or more interconnected pores in the top skin material in alternative embodiments, for example, where the top skin is formed from woven fiber mesh.

The bottom skin 34 of FIG. 1 is configured as a relatively thin sheet or layer of (e.g., solid, continuous, uninterrupted and/or fluidly impervious) material that extends longitudinally and laterally along the x-y plane. This bottom skin material may include, but is not limited to, a metal (e.g., sheet metal or metal foil), a polymer (e.g., thermoplastic or thermoset material), a fiber reinforced composite (e.g., fiberglass composite, carbon fiber composite, aramid fiber composite, etc.), or a combination thereof. The bottom skin material may be the same as or different than the top skin material. Referring to FIG. 3, the bottom skin 34 has a vertical thickness 42, which extends vertically between opposing second skin top and bottom side surfaces. This vertical thickness 42 may be substantially equal to or different (e.g., greater or less) than the vertical thickness 38 of the top skin 32.

Referring to FIG. 1, the cellular core 36 extends longitudinally and laterally along the x-y plane. Referring again to FIG. 3, the cellular core 36 has a vertical thickness 44, which extends vertically between opposing core sides respectively abutted against the top skin 32 and the bottom skin 34. The vertical thickness 44 may be substantially greater than the vertical thickness 38, 42 of the top skin 32 and/or the bottom skin 34. The vertical thickness 44 of the core 36, for example, may be at least ten to forty times (10-40×) or more greater than the vertical thickness 38, 42 of the skin 32, 34. The acoustic panel 30 of the present disclosure, however, is not limited to such an exemplary embodiment.

Figure 2:
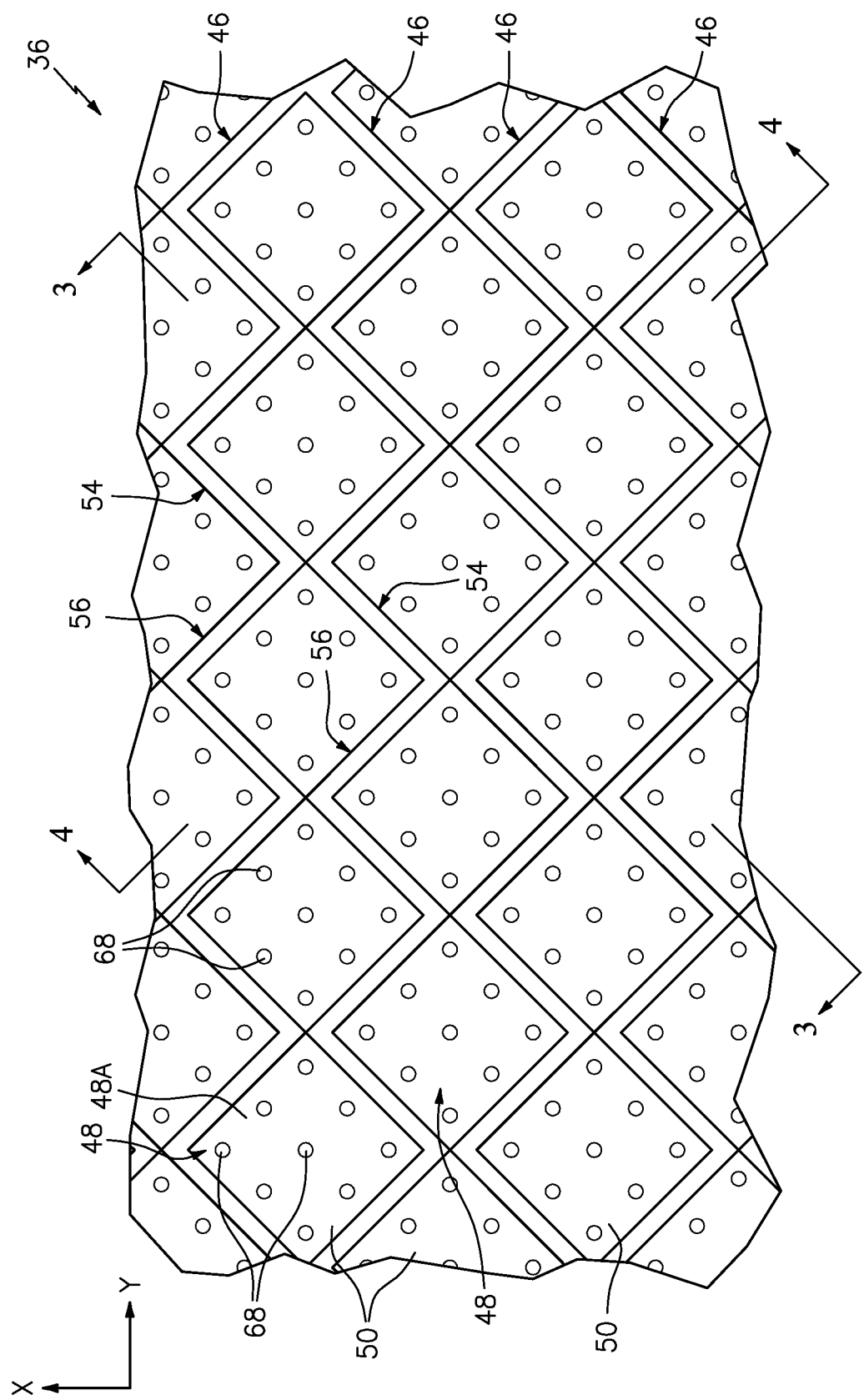
FIG. 2 is a cross-sectional illustration of the panel of FIG. 1 taken along line 2-2, in accordance with various embodiments.
Figure 4:
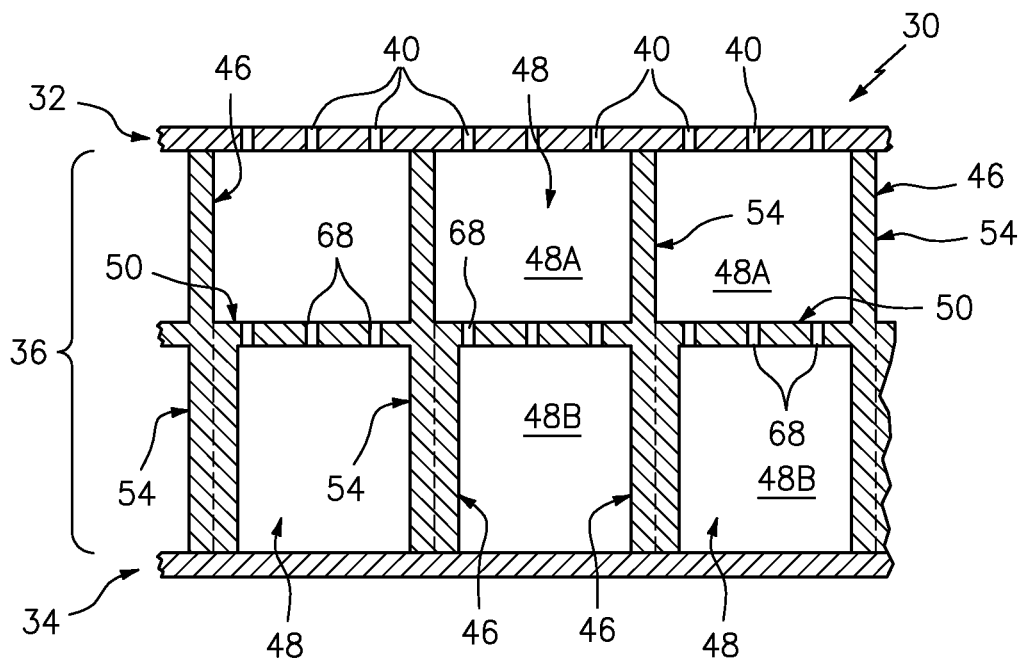
FIG. 4 is another side-sectional illustration of the panel of FIG. 1 taken along line 4-4 in FIG. 2, in accordance with various embodiments.

The cellular core 36 of FIGS. 2-4 includes a plurality of sidewalls 46 (e.g., corrugated sidewalls), a plurality of cavities 48 and a plurality of porous septums 50. Each of the sidewalls 46 of FIG. 5 has a corrugated configuration. More particularly, each of the sidewalls 46 includes a plurality of corrugations 52 arranged in an end-to-end longitudinally extending array. Each corrugation 52 includes a first sidewall segment 54 and a second sidewall segment 56. A first (e.g., distal, exterior) end of the first sidewall segment 54 is connected (e.g., directly) to a first (e.g., distal, exterior) end of a second sidewall segment 56 of a longitudinally adjacent corrugation 52 in the array, thereby forming an inter-corrugation peak 58. A second (e.g., proximal, interior) end of the first sidewall segment 54 is connected (e.g., directly) to a second (e.g., proximal, interior) end of the second sidewall segment 56 of the same corrugation 52, thereby forming an intra-corrugation peak 60. The first sidewall segment 54 and the second sidewall segment 56 are angularly offset from one another (e.g., in the x-y plane) by an acute angle 62 such as, but not limited to, about (e.g., +/−2°) or exactly ninety degrees (~90°). The first sidewall segment 54 has a first length 64. The second sidewall segment 56 has a second length 66 that may be substantially (e.g., +/−2%) or exactly equal to the first length 64.

Figure 5:
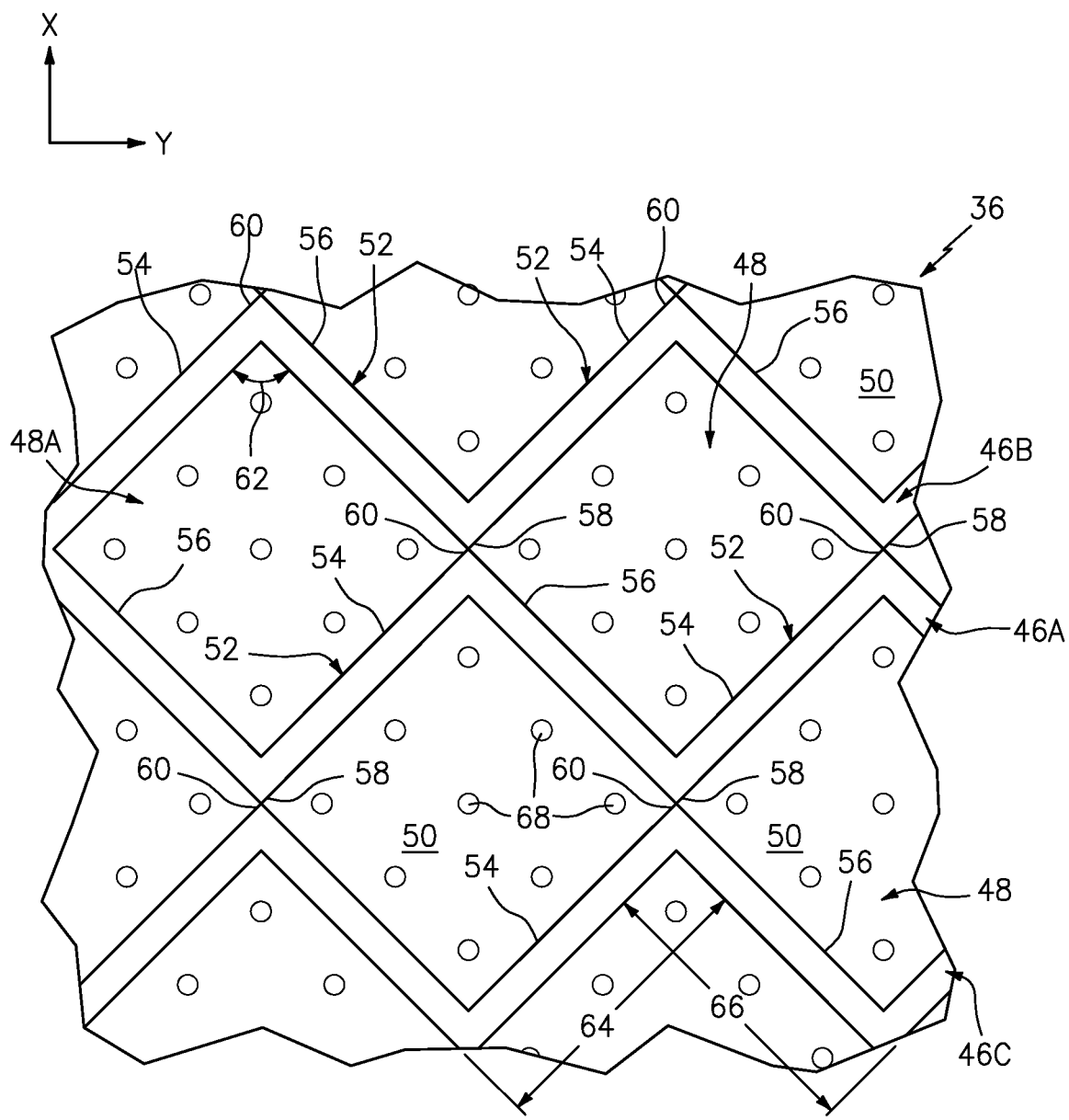
FIG. 5 is an enlarged view of a portion of the panel of FIG. 2, in accordance with various embodiments.

The sidewalls 46A-C (generally referred to as "46") of FIG. 5 are arranged in a side-by-side laterally extending array so as to form the cavities 48 within the cellular core 36. For example, the inter-corrugation peaks 58 of the sidewall 46A are (e.g., longitudinally) aligned with and are connected to the intra-corrugation peaks 60 of a respective laterally adjacent sidewall 46C. Furthermore, the intra-corrugation peaks 60 of the sidewall 46A are (e.g., longitudinally) aligned with and are connected to the inter-corrugation peaks 58 of another respective laterally adjacent sidewall 46B. With this configuration, each adjacent pair of the sidewalls 46 forms a set (e.g., a longitudinal extending array) of one or more of the cavities 48 within the cellular core 36.

Each of the cavities 48 extends laterally between a respective laterally adjacent pair of the sidewalls 46. For example, each of the cavities 48 extends laterally between the sidewall segments 54 and 56 of sidewalls 46A and 46B, respectively, and the sidewall segments 54 and 56 of sidewalls 46A and 46B, respectively. Each of the cavities 48 also extends longitudinally between the sidewall segments 54 and 56 of the respective sidewall 46A and the sidewall segments 54 and 56 of the respective sidewall 46B.

Figure 6:
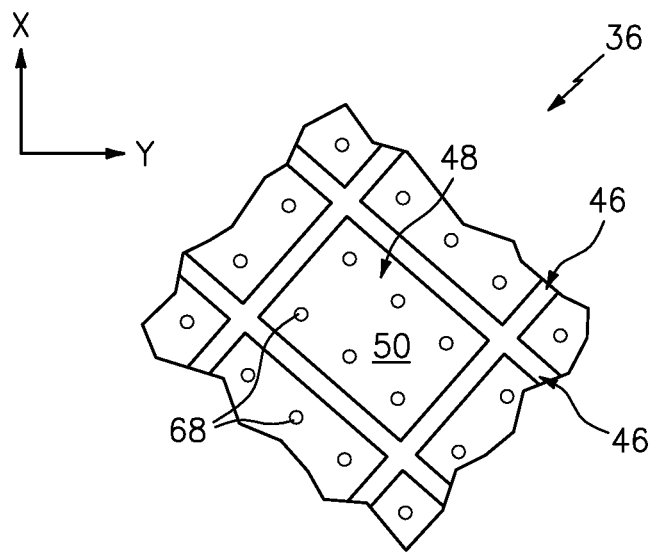
FIGS. 6 and 7 are cross-sectional illustrations of acoustic panels with alternative core configurations, in accordance with various embodiments.
Figure 7:
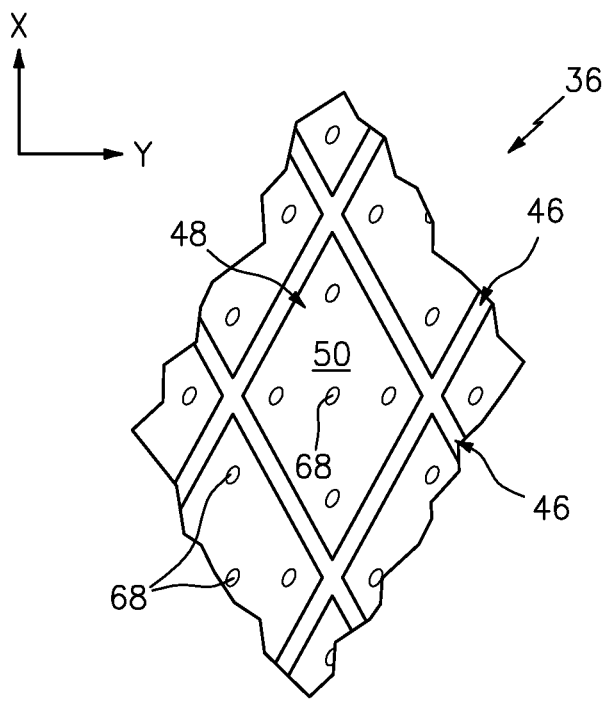

Each of the cavities 48 may have a four-sided polygonal shape when viewed in a plane, which may be parallel to an x-y plane as well as the top and/or bottom skins 32 and 34 (see FIG. 1). In the specific embodiment of FIG. 5, the four-sided polygonal shape is a square. However, in other embodiments, the four-sided polygonal shape may be a rectangle (see FIG. 6), a diamond (see FIG. 7) or otherwise.

Referring to FIGS. 3 and 4, each of the cavities 48 extends vertically through the cellular core 36 between and to the top skin 32 and the bottom skin 34. Thus, each of the cavities 48 is fluidly coupled with one or more respective passages 40 in the top skin 32. In the embodiments of FIGS. 2-4, each of the cavities 48 is fluidly discrete; e.g., not fluidly coupled with any other of the cavities 48 within the core 36. In other words, the each of the sidewall segments 54, 56 is solid, continuous, uninterrupted and/or fluidly impervious. The present disclosure, however, is not limited to such embodiments.

Referring to FIGS. 2-4, each of the septums 50 is located within a respective one of the cavities 48. Each of the septums 50 is configured to vertically divide the respective cavity 48 into a set (e.g., a pair) of fluidly coupled sub-cavities 48A and 48B. Each top sub-cavity 48A of FIGS. 3 and 4 extends vertically between and to the respective septum 50 and the top skin 32. Each bottom sub-cavity 48B of FIGS. 3 and 4 extends vertically between and to the respective septum 50 and the bottom skin 34.

Each of the septums 50 includes one or more passages 68; e.g., perforations such as through-holes. Each of these passages 68 extends generally vertically through the respective septum 50. Thus, the passages 68 are operable to fluidly couple the top and bottom sub-cavities 48A and 48B together across the septum 50. While the passages 68 are described above and illustrated in FIGS. 3 and 4 as through-holes for ease of description, one or more of the passages 68 may also or alternatively be formed by one or more interconnected pores in the septum material in alternative embodiments.

Referring to FIG. 5, each of the septums 50 extends laterally between a respective laterally adjacent pair of the sidewalls 46. More particularly, each of the septums 50 extends laterally between the sidewall segments 54 and 56 of sidewalls 46A and 46B, respectively, and the sidewall segments 54 and 56 of sidewalls 46A and 46B, respectively. Each of the septums 50 also extends longitudinally between the sidewall segments 54 and 56 of the respective sidewall 46A and the sidewall segments 54 and 56 of the respective sidewall 46B.

Each of the septums 50 may have a four-sided polygonal shape when viewed in a plane, which may be parallel to an x-y plane as well as the top and/or bottom skins 32 and 34 (see FIG. 1). In the specific embodiment of FIG. 5, the four-sided polygonal shape is a square. However, in other embodiments, the four-sided polygonal shape may be a rectangle (see FIG. 6), a diamond (see FIG. 7) or otherwise.

Figure 8:
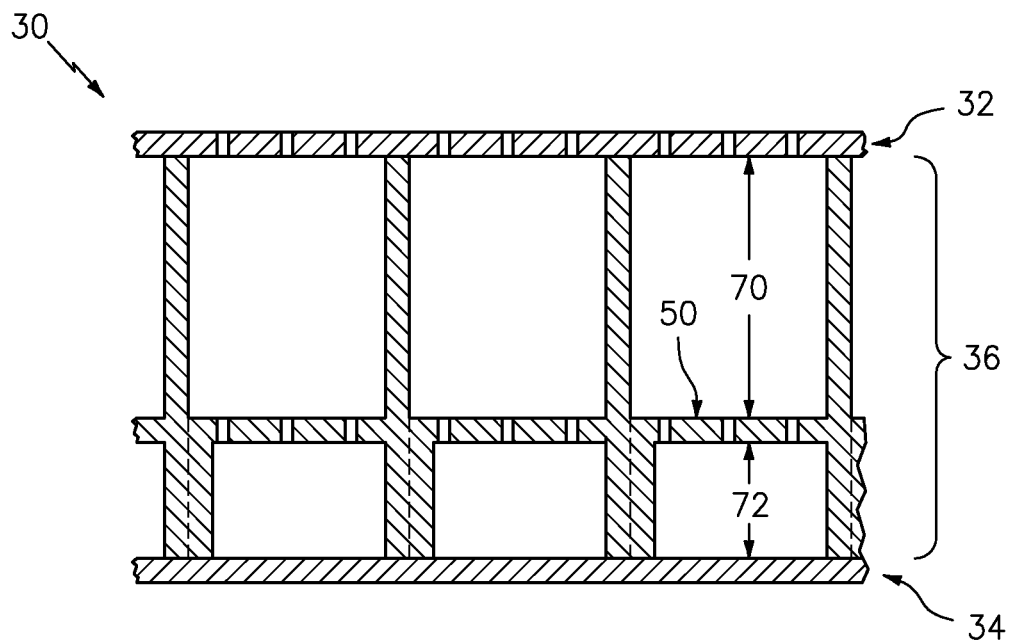
FIGS. 8 and 9 are side-sectional illustrations of acoustic panels with alternative core configurations, in accordance with various embodiments.
Figure 9:
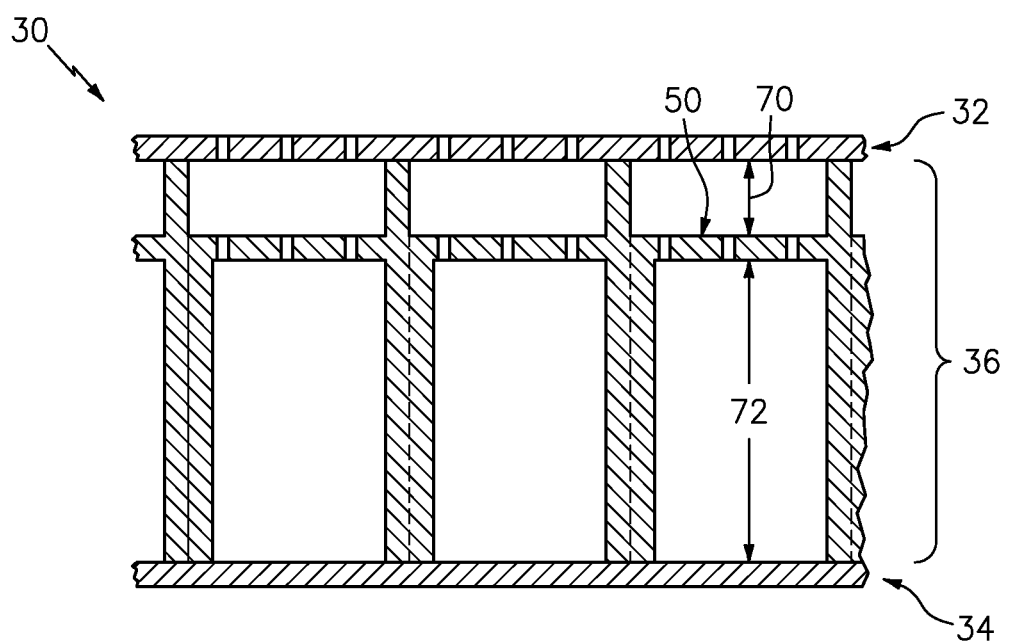

Referring to FIG. 3, each septum 50 is vertically displaced from the top skin 32 by a non-zero first distance 70. Each septum is vertically displaced from the bottom skin 34 by a non-zero second distance 72. This second distance 72 may be the same and the first distance 70 as shown in FIG. 3. Alternatively, the second distance 72 may be less than the first distance 70 as shown in FIG. 8. Still alternatively, the second distance 72 may be greater than the first distance 70 as shown in FIG. 9. The first and the second distances 70 and 72 may be sized based on the frequencies of sounds the panel 30 is intended to attenuate.

Figure 10:
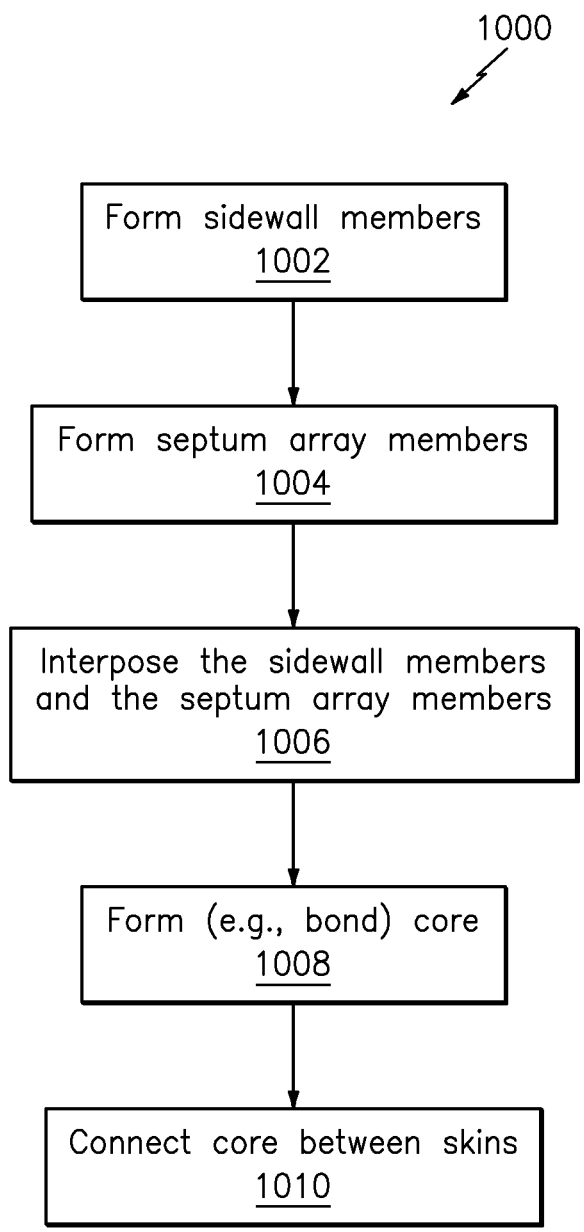
FIG. 10 is a flow diagram of a method for forming a multi-degree of freedom acoustic panel, in accordance with various embodiments.
Figure 11:
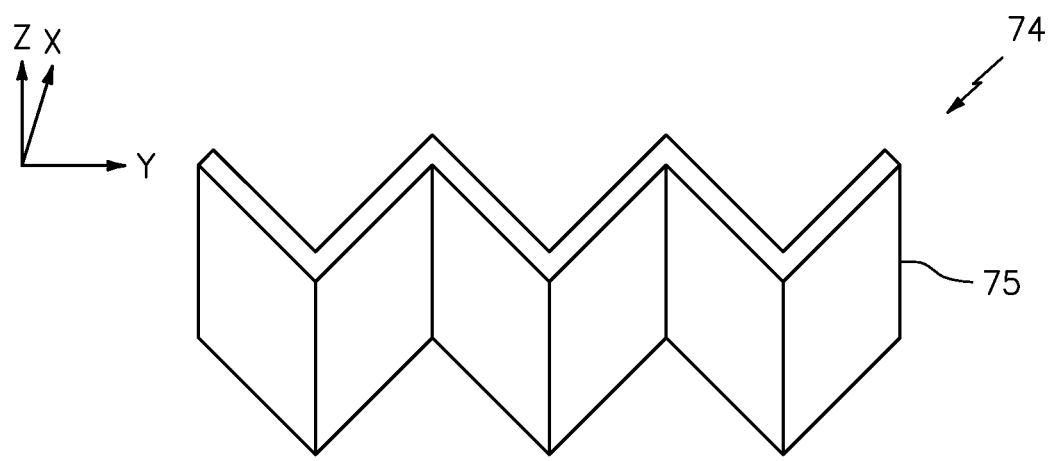
FIG. 11 is a perspective illustration of a sidewall member, in accordance with various embodiments.

FIG. 10 is a flow diagram of a method 1000 for forming an acoustic panel such as, but not limited to, the acoustic panel 30 of FIGS. 1-4. In step 1002, one or more sidewall members 74 are formed. An embodiment of an exemplary one of the sidewall members 74 is shown in FIG. 11. To form the sidewall member 74 of FIG. 11, a ply (e.g., a single sheet, strip or ribbon) of material 75 may be cut to size and is folded to generally have a configuration similar to the corrugated configuration of a respective one of the sidewalls 46; e.g., see FIG. 2.

Figure 12:
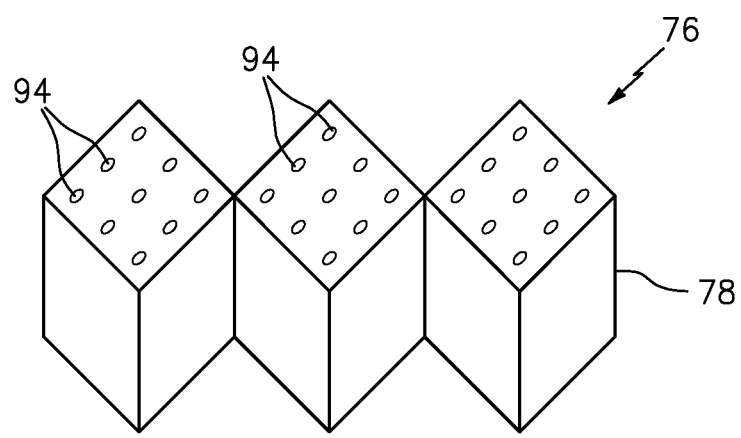
FIG. 12 is a perspective illustration of a septum array member, in accordance with various embodiments.
Figure 13:
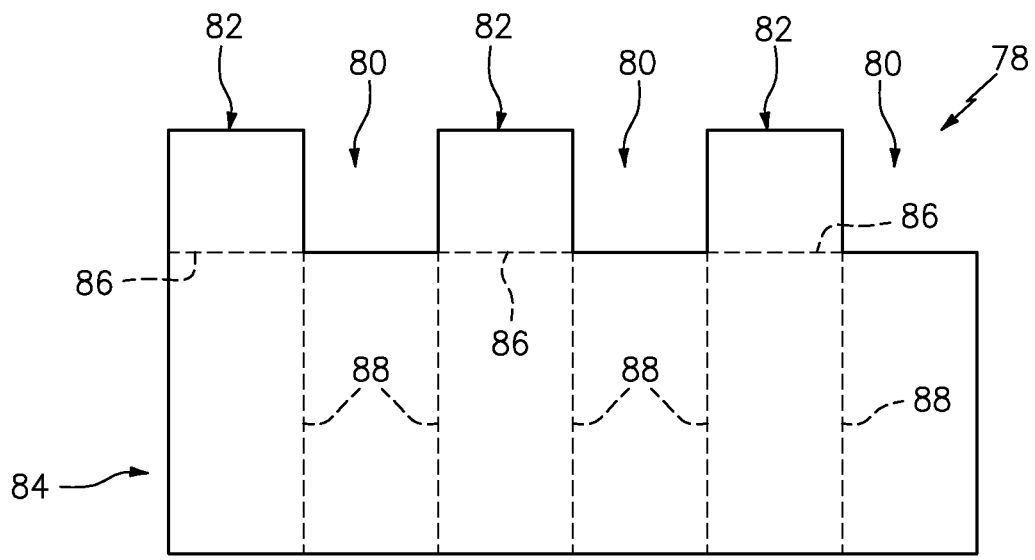
FIGS. 13-15 illustrate a sequence of steps for forming the septum array member of FIG. 12, in accordance with various embodiments.
Figure 14:
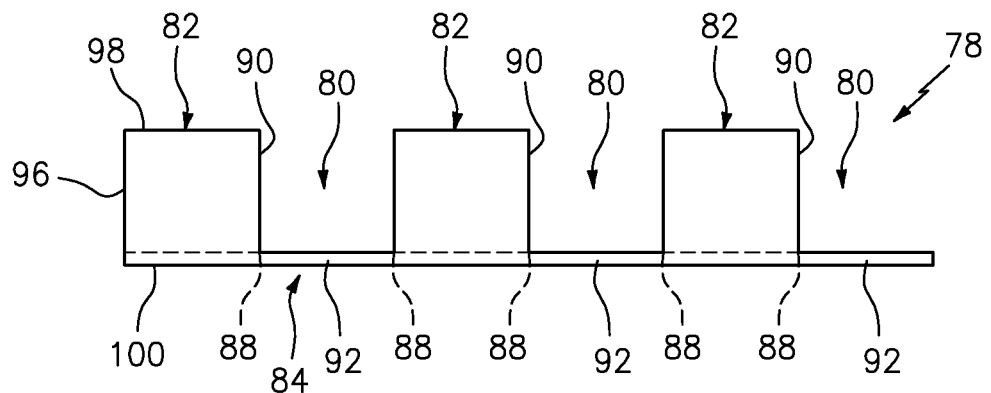
Figure 15:
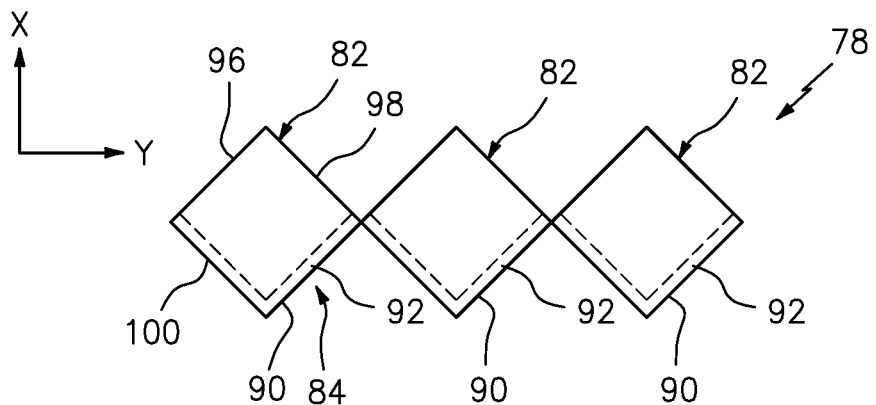

In step 1004, one or more septum array members 76 is formed. An embodiment of an exemplary one of the septum array members 76 if shown in FIG. 12. To form the septum array member 76 of FIG. 12, a ply (e.g., a single sheet, strip or ribbon) of material 78 may be cut to size. Referring to FIG. 13, one or more apertures 80 (e.g., cutouts) are formed (e.g., cut) in the ply of material 78 to provide the ply of material 78 with one or more castellations 82 (e.g., projections) and a base 84. Each of the castellations 82 projects vertically out from a top edge of the base 84. Adjacent castellations 82 are longitudinally separated by a respective one of the apertures 80. Thus, the castellations 82 are interposed with the apertures 80. Referring to FIG. 14, each of the castellations 82 is folded along a respective fold line 86 (see FIG. 13) such that, for example, the castellation 82 is angularly offset from the base 84 by an acute angle such as, but not limited to, about (e.g., +/−2°) or exactly ninety degrees (~90°). Referring to FIG. 15, the base 84 is folded back and forth (e.g., accordion folded) along fold lines 88 (see FIG. 13) to provide the base 84 with a corrugated configuration. A free side edge 90 of each castellation 82 may then be attached (e.g., bonded) to a respective aperture edge 92 of the base 84. A plurality of apertures 94 (see FIG. 12) may then be formed in the castellations 82, which apertures 94 will become the passages 68 of FIG. 2. Of course, this perforation process may be performed earlier or later during this method 1000 in alternative embodiments.

Figure 16:
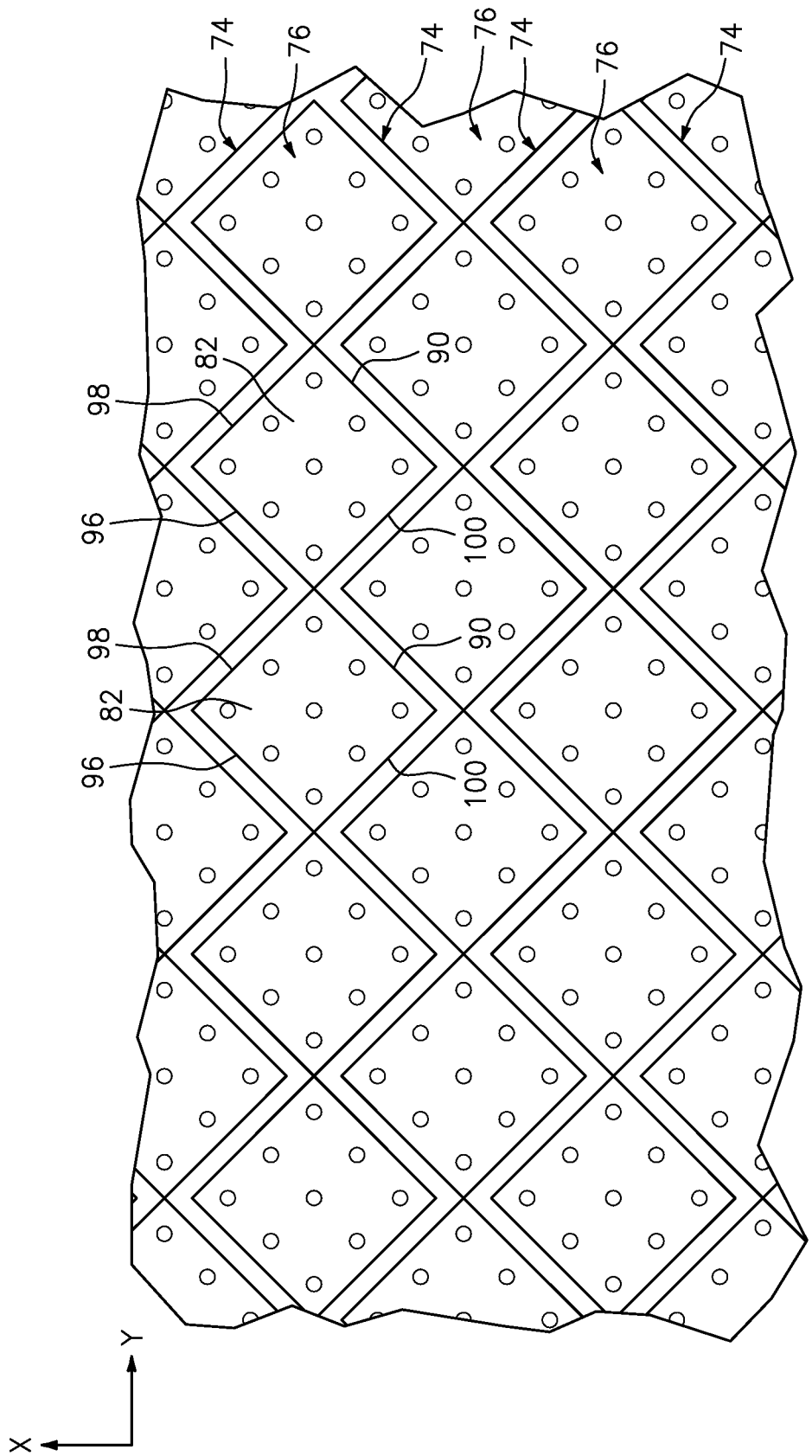
FIG. 16 is an illustration of a core with septum array members interposed with and connected to sidewall members, in accordance with various embodiments.

In step 1006, the septum array members 76 are interposed with the sidewall members 74. For example, referring to FIG. 16, each septum array member 76 is located laterally between and abutted against an adjacent pair of the sidewall members 74.

In step 1008, the cellular core 36 is formed. In particular, the members 74 and 76 are attached together via, for example, welding, brazing, adhering and/or otherwise bonding. For example, one or both of the remaining free edges 96 and 98 of each castellation 82 are attached to a respective one of the sidewall members 74 at interfaces. One or more of the remaining edges 90 and 100 of each castellation 82 may similarly be attached to another respective one of the sidewall members 74 at interfaces. In addition or alternatively, referring to FIG. 17, the base 84 may be attached to the respective sidewall member 74. In this manner, the (e.g., single) ply of folded material 78 forming each septum array member 76 may solely and completely define a respective longitudinal array of the septums 50. Thus, each septum 50 may be configured from (e.g., only include) a respective castellation 82. The ply of folded material 78 also forms a bottom portion of a respective sidewall 46 with a respective sidewall member 74.

Figure 17:
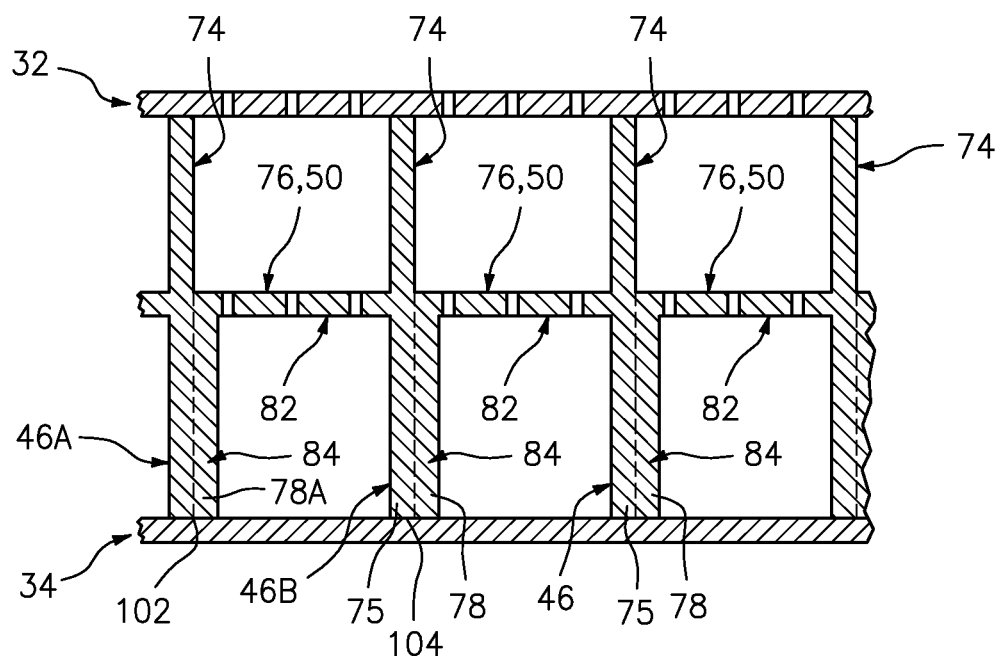
FIG. 17 is a side-sectional illustration of the core of FIG. 16 between a pair of skins, in accordance with various embodiments.

In step 1010, the core 36 is connected between the top and the bottom skins 32 and 34 as shown, for example, in FIG. 17. More particularly, the cellular core 36 is positioned between the top skin 32 and the bottom skin 34. The cellular core 36 is then attached to the skins 32 and 34 via, for example, welding, brazing, adhering and/or otherwise bonding. The top skin 32 may be perforated before or after the cellular core 36 is attached to the top skin 32

With the configuration of FIG. 17, the base 84 of each ply of folded material (e.g., 78A) vertically contacts and may be attached to the bottom skin 34 at an interface (e.g., 102) between the sidewall (e.g., 46A) and the bottom skin 34. By contrast, the respective ply of folded material (e.g., 78A) is vertically displaced from the bottom skin 34 at an interface (e.g., 104) between the sidewall (e.g., 46B) and the bottom skin 34. Thus, at the interface (e.g., 104), the ply of folded material (e.g., 78A) does not contact the bottom skin 34 as the elements (e.g., 78A and 34) are completely vertically separated by a vertical gap.

Figure 18:
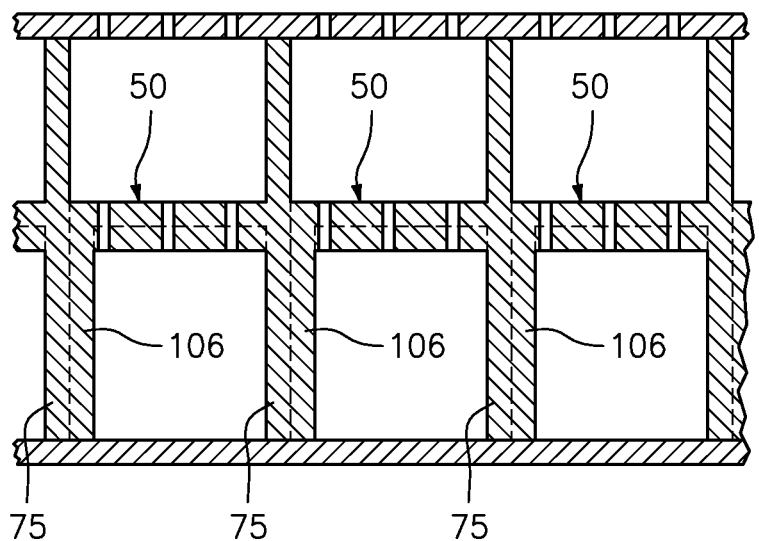
FIG. 18 is a side-sectional illustration of an acoustic panel with an alternative core configuration, in accordance with various embodiments.
Figure 19:
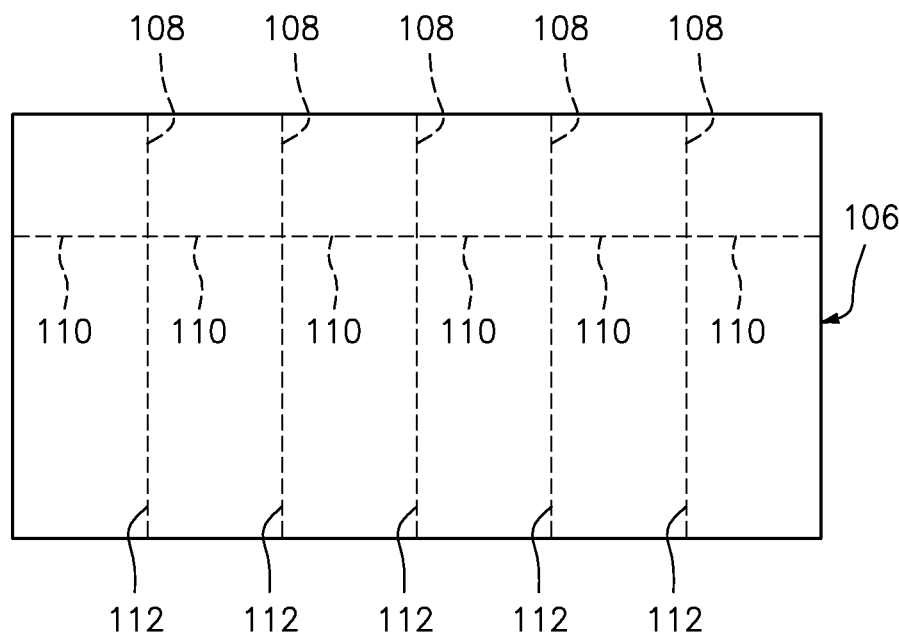
FIGS. 19-21 illustrate a sequence of steps for forming the core of FIG. 18, in accordance with various embodiments.
Figure 20:
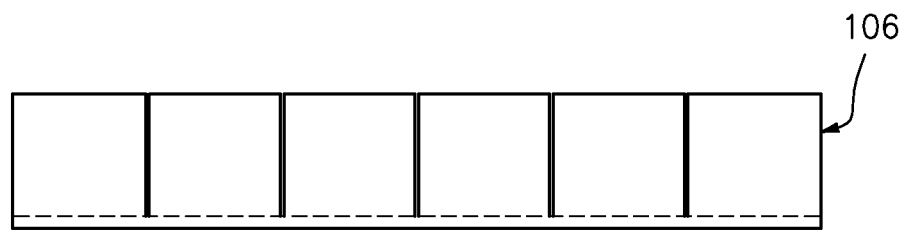
Figure 21:
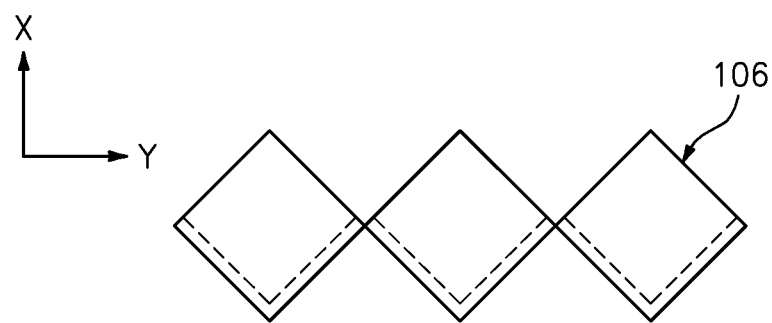

In the embodiments described above, each septum 50 has a single ply layer construction. In other embodiments, however, one or more of the septums 50 may each have a multi (e.g., two) ply layer construction as illustrated, for example, in FIG. 18. More particularly, each septum 50 may be formed by at least two overlapping and abutting portions of a ply of material. Such a multi ply layer construction may be provided by cutting a ply of material 106 along cut lines 108 and then folding the cut ply of material along fold lines 110 and 112 as shown in the sequence of FIGS. 19-21.

Figure 22:
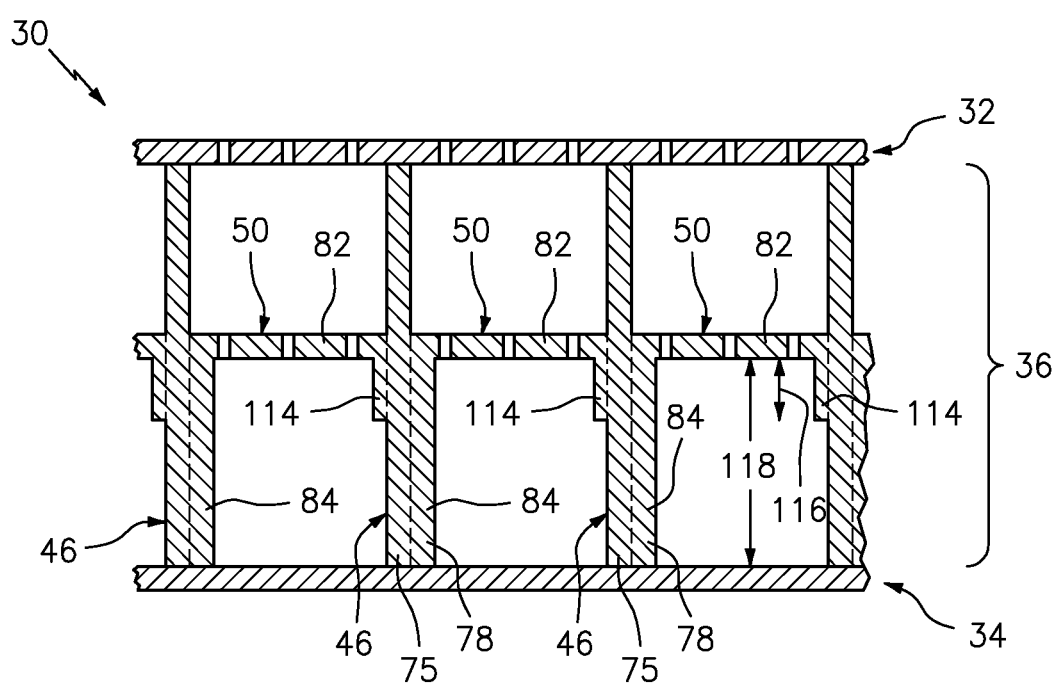
FIG. 22 is a side-sectional illustration of an acoustic panel with a still another alternative core configuration, in accordance with various embodiments.

In some embodiments, one or more of the castellations 82 may each be configured with a tab 114 as shown in FIG. 22. This tab 114 may facilitate the attachment of the castellation 82 to the sidewall member 74 opposite the base 84. The tab 114 also serves to form a portion of the respective sidewall 46. Each tab 114 of FIG. 22 has a vertical height 116 that is less than a vertical height 118 of the base 84. Thus, none of the tabs 114 contacts or is directly attached to the bottom skin 34.

In the embodiments described above, each ply of folded material 78 forming a respective septum array member 76 is described as contacting and/or being attached to the bottom skin 34. In alternative embodiments, however, the septum array member 76 may be flipped such that the ply of folded material 78 contacts and may be attached to the top skin 32.

The cellular core 36 and its plies of material may include, but is not limited to, a metal (e.g., sheet metal or metal foil), a polymer (e.g., thermoplastic or thermoset material), a fiber reinforced composite (e.g., fiberglass composite, carbon fiber composite, aramid fiber composite, etc.), or a combination thereof. In some embodiments, the cellular core 36 and its plies of material may be formed from woven fiber mesh (e.g., polymer or fiber mesh). The core/ply material may be the same as or different than the top skin material and/or the bottom skin material.

In some embodiments, each peak 58, 60 may be configured from a sharp bend between the respective sidewall segments 54 and 56, for example, as illustrated in FIG. 5. However, in other embodiments, one or more of the peaks 58 and/or 60 may each be configured from a small radius bend between the respective sidewall segments 54 and 56, for example, as illustrated in FIG. 23.

Referring to FIG. 24, in some embodiments, the septum 50 heights may vary between laterally adjacent cavities 48.

Referring to FIGS. 25 and 26, in some embodiments, a perimeter of one or more of the septums 50 may be fully capped; e.g., include material tabs 114' and 114" on three sides of a septum base 82'.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. An acoustic panel, comprising:
   a first skin, a second skin and a cellular core vertically between and connected to the first skin and the second skin, the cellular core comprising a plurality of cavities, a plurality of sidewalls and a plurality of septums;
   each of the plurality of cavities extending vertically through the cellular core between the first skin and the second skin, and each of the plurality of cavities extending laterally within the cellular core between a respective laterally adjacent pair of the plurality of sidewalls;
   each of the plurality of septums vertically dividing a respective one of the plurality of cavities into a set of fluidly coupled sub-cavities;
   a set of the plurality of septums formed by a ply of folded material; and
   each of the set of the plurality of septums having a four-sided polygonal shape when viewed in a plane that is parallel to the first skin;
   the plurality of sidewalls comprising a first sidewall and a second sidewall;
   the plurality of cavities comprising a first cavity that extends laterally between the first sidewall and the second sidewall;
   the plurality of septums comprising a first septum within the first cavity;
   the ply of folded material forming the first septum;
   the first sidewall comprising a second ply of material;
   the second sidewall comprising a third ply of material; and
   the first sidewall further comprising a first portion of the ply of folded material.

2. The acoustic panel of claim 1, wherein the four-sided polygonal shape is a square.

3. The acoustic panel of claim 1, wherein the set of the plurality of septums are arranged in a longitudinal extending array.

4. The acoustic panel of claim 1, wherein the second sidewall further comprises a second portion of the ply of folded material.

5. The acoustic panel of claim 4, wherein the first portion has a first vertical height, and the second portion has a second vertical height that is different from the first vertical height.

6. The acoustic panel of claim 4, wherein the first portion vertically contacts the second skin, and the second portion does not contact the second skin.

7. The acoustic panel of claim 1, wherein the first portion vertically contacts the second skin.

8. The acoustic panel of claim 1, wherein the ply of folded material comprises metal.

9. The acoustic panel of claim 1, wherein the ply of folded material comprises polymer.

10. The acoustic panel of claim 1, wherein the ply of folded material comprises fiber-reinforced composite.

11. The acoustic panel of claim 1, wherein the ply of folded material comprises woven fiber mesh.

12. The acoustic panel of claim 1, wherein the first skin is a perforated first skin.

13. The acoustic panel of claim 1, wherein a second set of the plurality of septums are formed by a second ply of folded material, and the second set of the plurality of septums is laterally adjacent the set of the plurality of septums.

14. The acoustic panel of claim 1, wherein the first septum comprises a second portion of the ply of folded material and a third portion of the ply of folded material that overlaps and lays against the second portion of the ply of folded material.

15. An acoustic panel, comprising:
   a first skin, a second skin and a cellular core vertically between and connected to the first skin and the second skin, the cellular core comprising a plurality of cavities, a plurality of sidewalls and a plurality of septums;
   each of the plurality of cavities extending vertically through the cellular core between the first skin and the second skin, and each of the plurality of cavities extending laterally within the cellular core between a respective laterally adjacent pair of the plurality of sidewalls;
   each of the plurality of septums vertically dividing a respective one of the plurality of cavities into a set of fluidly coupled sub-cavities;
   the plurality of sidewalls comprising a first sidewall and a second sidewall;
   a first sidewall segment of the first sidewall connected to a second sidewall segment of the first sidewall the at a first peak;
   a first sidewall segment of the second sidewall connected to a second sidewall segment of the second sidewall the at a second peak, and the second peak aligned with and meeting the first peak at an interface between the first sidewall and the second sidewall;
   the plurality of cavities comprising a first cavity that extends laterally between the first sidewall and the second sidewall;
   the plurality of septums comprising a first septum within the first cavity;
   wherein a ply of folded material forms at least the first septum and a portion of the first sidewall; and
   the ply of folded material contacts the second skin at an interface between the first sidewall and the second skin, and is separated from the second skin at an interface between the second sidewall and the second skin.

16. The acoustic panel of claim 15, wherein the ply of folded material further forms a portion of the second sidewall.

17. An acoustic panel, comprising:
   a first skin, a second skin and a cellular core vertically between and connected to the first skin and the second skin, the cellular core comprising a plurality of cavities, a plurality of sidewalls and a plurality of septums;
   each of the plurality of cavities extending vertically through the cellular core between the first skin and the second skin, and each of the plurality of cavities extending laterally within the cellular core between a respective laterally adjacent pair of the plurality of sidewalls;

each of the plurality of septums vertically dividing a respective one of the plurality of cavities into a set of fluidly coupled sub-cavities, and each of the plurality of septums vertically separated from the first skin and the second skin; and a set of the plurality of septums formed by a ply of folded material;

wherein the plurality of septums comprises a first septum; and wherein the first septum comprises a first portion of the ply of folded material and a second portion of the ply of folded material that lays against the first portion of the ply of folded material.

18. The acoustic panel of claim 1, wherein the first septum is vertically displaced from the first skin by a non-zero first distance; and the first septum is vertically displaced from the second skin by a non-zero second distance.

19. The acoustic panel of claim 1, wherein the first sidewall includes a plurality of corrugations arranged in an end-to-end longitudinally extending array.

20. The acoustic panel of claim 1, wherein the first sidewall comprises a first corrugation with a first peak; and the second sidewall comprises a second corrugation with a second peak that is aligned with and connected to the first peak.

* * * * *